US010579556B2

(12) United States Patent
Feng et al.

(10) Patent No.: US 10,579,556 B2
(45) Date of Patent: Mar. 3, 2020

(54) ALLOCATING ADDRESS SPACE

(71) Applicant: International Business Machines Corporation, Armonk, NY (US)

(72) Inventors: Bo Qun Bq Feng, Shanghai (CN); Zhong Li, Shanghai (CN); Xian Dong Meng, Shanghai (CN); Yong Ji Jx Xie, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 15/681,620

(22) Filed: Aug. 21, 2017

(65) Prior Publication Data
US 2019/0057054 A1 Feb. 21, 2019

(51) Int. Cl.
| | |
|---|---|
| *G06F 12/02* | (2006.01) |
| *G06F 13/16* | (2006.01) |
| *G06F 12/1081* | (2016.01) |
| *G06F 9/50* | (2006.01) |
| *G06F 12/1009* | (2016.01) |

(52) U.S. Cl.
CPC ........ *G06F 13/1694* (2013.01); *G06F 9/5016* (2013.01); *G06F 12/1081* (2013.01); *G06F 12/1009* (2013.01); *G06F 2212/65* (2013.01)

(58) Field of Classification Search
None
See application file for complete search history.

(56) References Cited

U.S. PATENT DOCUMENTS

| | | | |
|---|---|---|---|
| 5,778,197 A | 7/1998 | Dunham | |
| 7,478,176 B2 | 1/2009 | Zimmer et al. | |
| 7,647,438 B1 * | 1/2010 | Norrie | G06F 7/24 370/351 |
| 8,176,475 B2 | 5/2012 | Kosche et al. | |
| 8,560,805 B1 | 10/2013 | Yakovlev et al. | |
| 9,135,183 B2 | 9/2015 | Tian et al. | |
| 9,274,940 B2 | 3/2016 | Peng | |
| 10,268,390 B2 | 4/2019 | Warfield et al. | |
| 2005/0066108 A1 | 3/2005 | Zimmer et al. | |
| 2008/0288737 A1 * | 11/2008 | Zhuang | G06F 8/441 711/165 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

* cited by examiner

*Primary Examiner* — Charles Rones
*Assistant Examiner* — Ryan Dare
(74) *Attorney, Agent, or Firm* — Heslin Rothenberg Farley & Mesiti P.C.; Tihon Poltavets, Esq.

(57) ABSTRACT

A method, computer program product, and system includes a processing circuit(s) allocating a page of system memory address space to a device. The allocating includes the processing circuits(s) obtaining base address registers of the device in a bus and determining a portion of the page of the system memory address space to allocate to the base address registers. The processing circuits(s) sorts the base address registers, in a descending order, according to their alignments and adds sizes of the sorted base address registers to determine the portion of the page. The processing circuit(s) determines a remainder of the page: a difference between a size of the page and the portion of the page. The processing circuit(s) requests a virtual resource of a size equal to the remainder and allocates the page to the sorted base address registers and to the virtual resource.

20 Claims, 13 Drawing Sheets

ALLOCATING ADDRESS SPACE

BACKGROUND

A Peripheral Component Interconnect (PCI) device is a piece of computer hardware that plugs directly into a PCI slot on a computer's motherboard. Examples of PCI devices include, but are not limited to: network interface cards, audio cards, and sound cards. Each Base Address Register (BAR) of a PCI device attached to a PCI bus requires a pre-defined amount of system memory address space. The particular system requirements such as size, alignment, and starting address of each BAR determine how the memory address space is allocated.

SUMMARY

Shortcomings of the prior art are overcome and additional advantages are provided through the provision of a method for allocating system memory address space to a device. The method includes, for instance: allocating, by one or more processing circuits, a page of system memory address space in a computing system to a device, the allocating comprising: obtaining, by the one or more processing circuits, one or more base address registers of the device in a bus communicatively coupled to the one or more processing circuits; determining, by the one or more processing circuits, a portion of the page of the system memory address space to allocate to the one or more base address registers of the device, the determining comprising: sorting, by the one or more processing circuits, the one or more base address registers, in a descending order, according to alignments of the one or more base address registers; and adding, by the one or more processing circuits, sizes of the sorted one or more base address registers to determine the portion of the page; and determining, by the one or more processing circuits, a remainder of the page, wherein the remainder comprises a difference between a size of the page and the portion of the page; based on the remainder being greater than zero, requesting, by the one or more processing circuits, a virtual resource of a size equal to the remainder; and allocating, by the one or more processing circuits, the page to the sorted one or more base address registers and the virtual resource.

Shortcomings of the prior art are overcome and additional advantages are provided through the provision of a computer program product for allocating system memory address space to a device. The computer program product comprises a storage medium readable by a processing circuit and storing instructions for execution by the processing circuit for performing a method. The method includes, for instance: allocating, by one or more processing circuits, a page of system memory address space in a computing system to a device, the allocating comprising: obtaining, by the one or more processing circuits, one or more base address registers of the device in a bus communicatively coupled to the one or more processing circuits; determining, by the one or more processing circuits, a portion of the page of the system memory address space to allocate to the one or more base address registers of the device, the determining comprising: sorting, by the one or more processing circuits, the one or more base address registers, in a descending order, according to alignments of the one or more base address registers; and adding, by the one or more processing circuits, sizes of the sorted one or more base address registers to determine the portion of the page; and determining, by the one or more processing circuits, a remainder of the page, wherein the remainder comprises a difference between a size of the page and the portion of the page; based on the remainder being greater than zero, requesting, by the one or more processing circuits, a virtual resource of a size equal to the remainder; and allocating, by the one or more processing circuits, the page to the sorted one or more base address registers and the virtual resource.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
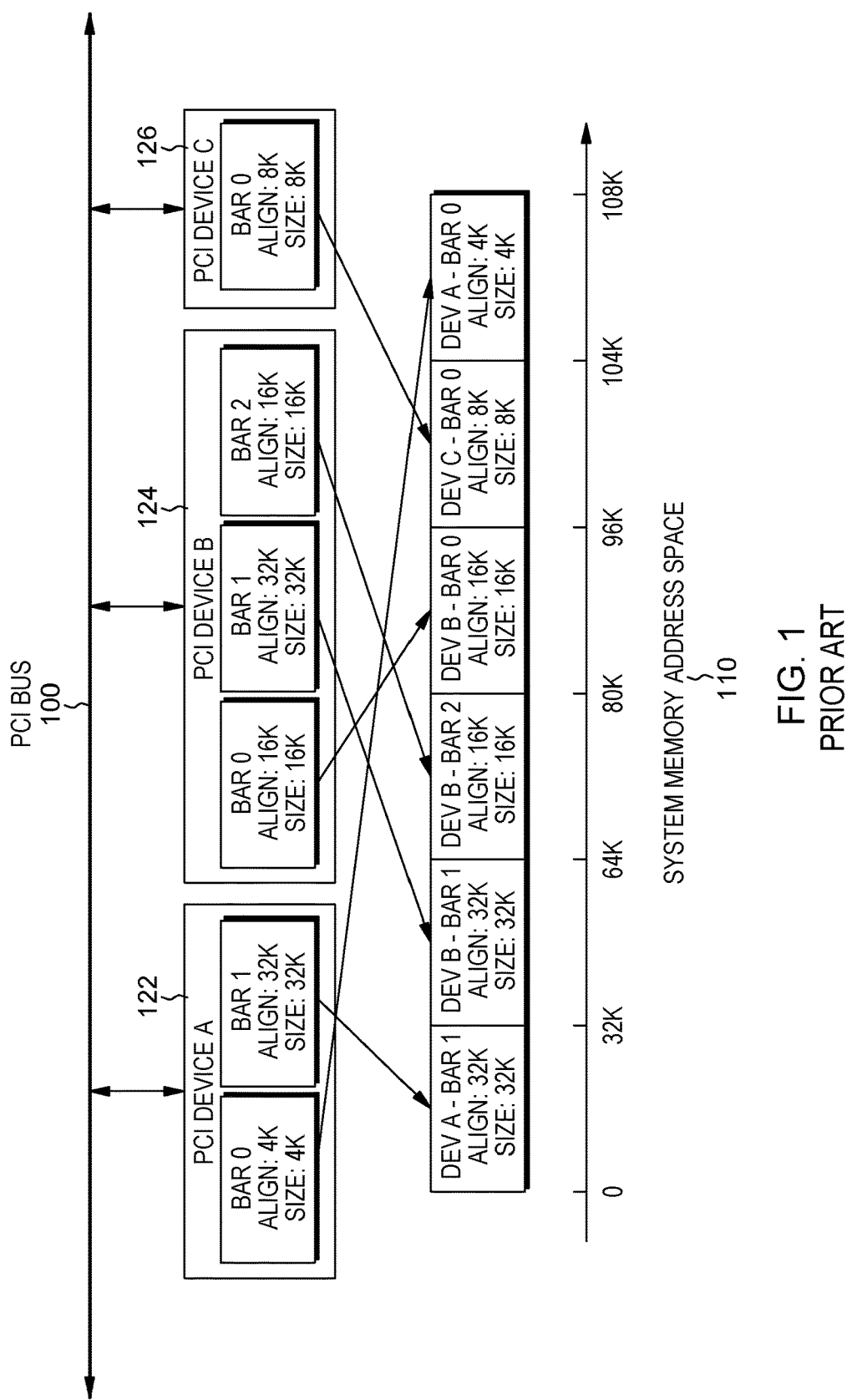
FIG. 1 is an illustration of various aspects of a current method of allocating memory space to a PCI device.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 12:
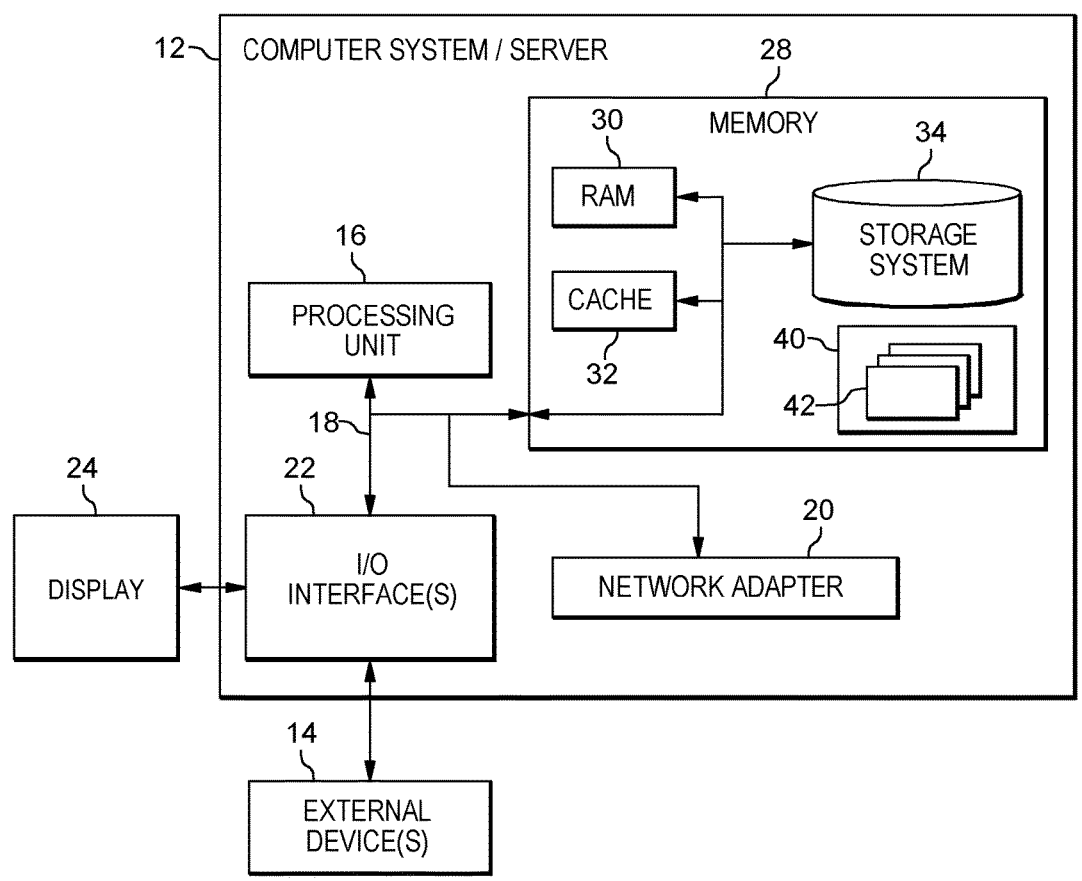
FIG. 12 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 12 as program/utility 40, having a set (at least one) of program modules 42, may be stored in memory 28.

Embodiments of the present invention include a computer-implemented method, a computer program product, and a computer system for allocating system memory address space for small-size Base Address Registers (BARs) in a virtualized environment. A BAR is the granularity of resource allocation of PCI devices. A BAR is referred to herein as a small-size BAR when it is smaller than a page is the memory address space of a computer system.

An aspect of certain embodiments of the present invention includes one or more programs, executed by one or more processing circuits, sorting small-size BARs in a descending order for each PCI device and calculating the size of allocated memory address space. An advantage of this aspect is that this method of allocation provides isolation between memory address spaces in separate PCI devices. In part to provide this advantage, in some embodiments of the present invention, one or more programs sort the small-size BARs according to their alignment, in descending order, for each device, and allocate the memory address space from one device, to another device. In some embodiments of the present invention, the one or more programs verify the size of allocated memory address space, utilizing the size of a page, to determine a remainder (remaining space) of the page, which is not filled by the BARs of PCI device. Upon determining the remainder, the one or more programs assign a virtual resource into the remainder of the page, which prevents the sharing of a given page allocated to BARs of one PCI device, with other device BARs.

Prior to discussing aspects of the present invention and the advantages offered in PCI device memory allocation by embodiments of the present invention that include these aspects, the shortcomings of current allocation methods are reviewed below, for contrast. Specifically, FIG. 1 illustrates aspects of a current method of allocating memory address space.

Referring to FIG. 1, PCI devices 122 124 126 are attached to a PCI bus 100 and each requires a pre-defined amount of system memory address space. In general, to address a PCI device, the PCI device is enabled by being mapped into the system's I/O port address space or memory-mapped address space 110. One or more programs, which may include the system's firmware, device drivers and/or the operating system, program BARs to inform each PCI device of its address mapping by writing configuration commands to a PCI controller. PCI devices are in an inactive state upon system reset, so they will have no addresses assigned to them, by which the operating system or device drivers can communicate with them. Thus, one or more programs in either the Basic Input/Output System (BIOS) and/or the operating system geographically addresses the PCI slots of a motherboard through the PCI controller, using the per slot Initialization Device Select (IDSEL) signals. System firmware may assign base addresses in a PCI address domain to a BAR such that each addressable region can be either memory or I/O space. In one example, a value contained in a bit of a BAR identifies the type, a value of a bit indicates a memory space, and a value of a bit indicates an I/O space.

In current systems, one or more programs allocate memory address space 110 based on particular system requirements, including but not limited to, size, alignment and the starting address of each BAR. In FIG. 1, three different PCI devices utilize a common PCI bus 100: PCI Device A 122, PCI Device B 124, and PCI Device C 126. One or more programs allocate the system memory address space 110, such that portions of the various PCI devices are allocated to different BARs. In FIG. 1, one or more programs allocated PCI Device A 122 system memory address space 110 in BAR 0 and BAR 1, PCI Device B 124 system memory address space 110 in BAR 0, BAR 1, and BAR 2, and PCI Device C 126, system memory address space 110 in BAR 0.

Referring to FIG. 1, in thus current method, in order to allocate the memory address space 110 according to a current method, the one or more programs sort all PCI devices' BARs on a PCI bus according to their alignments, in a descending order. The one or more programs then allocate the BARs in the order of memory address space 110, as determined by the sorted list. Although this method is arguably fast and efficient method for allocating the memory address space 110, it does not reliably provide isolation between memory address spaces in separate PCI devices. For example, when utilizing this current method to allocated the memory address space 110 on a platform whose page size is larger than 4 KB (the minimum size of BAR according to PCI specification) BARs from different PCI devices may share one page (i.e., the minimum unit of memory). When because the size is less than a page size, one or more programs utilizing current methods to allocate memory address space 110 to PCI devices 122-126, do not provide isolation between memory address spaces 100 in separate PCI devices 122-126.

Figure 2:
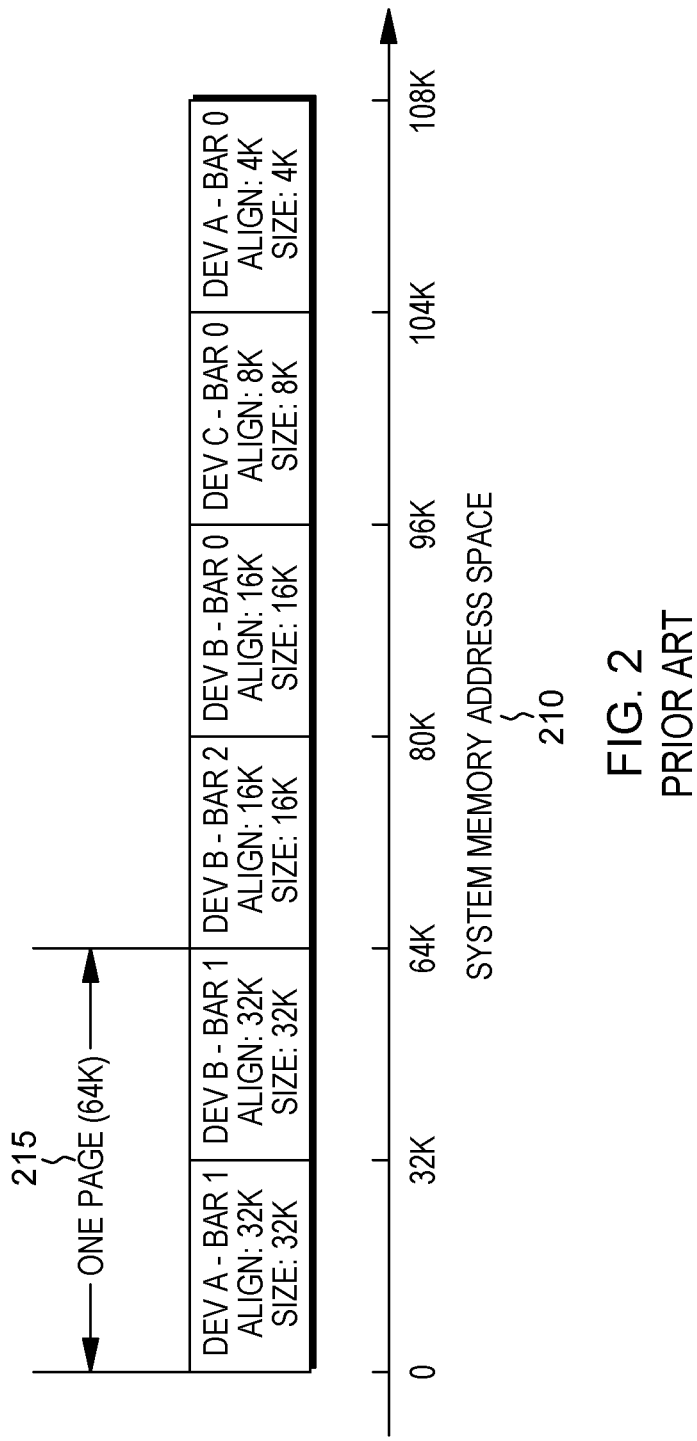
FIG. 2 is an illustration of various aspects of a current method of allocating memory space to a PCI device.

FIG. 2 illustrates how utilizing current allocation methods can result in different PCI devices sharing one page. In FIG. 2, which highlights certain aspects of FIG. 1, after the one or more programs allocate the system memory address space 210, the one page 215 is shared between a BAR of PCI Device A 122 (FIG. 1), and a BAR of PCI Device B 124 (FIG. 1). A drawback of one or more PCI device BARs sharing a common memory page is that the sharing may result in certain performance issues during a passthrough of one device (because of the small-size BARs) to a virtual machine (VM) in a virtualized environment.

Figure 3:
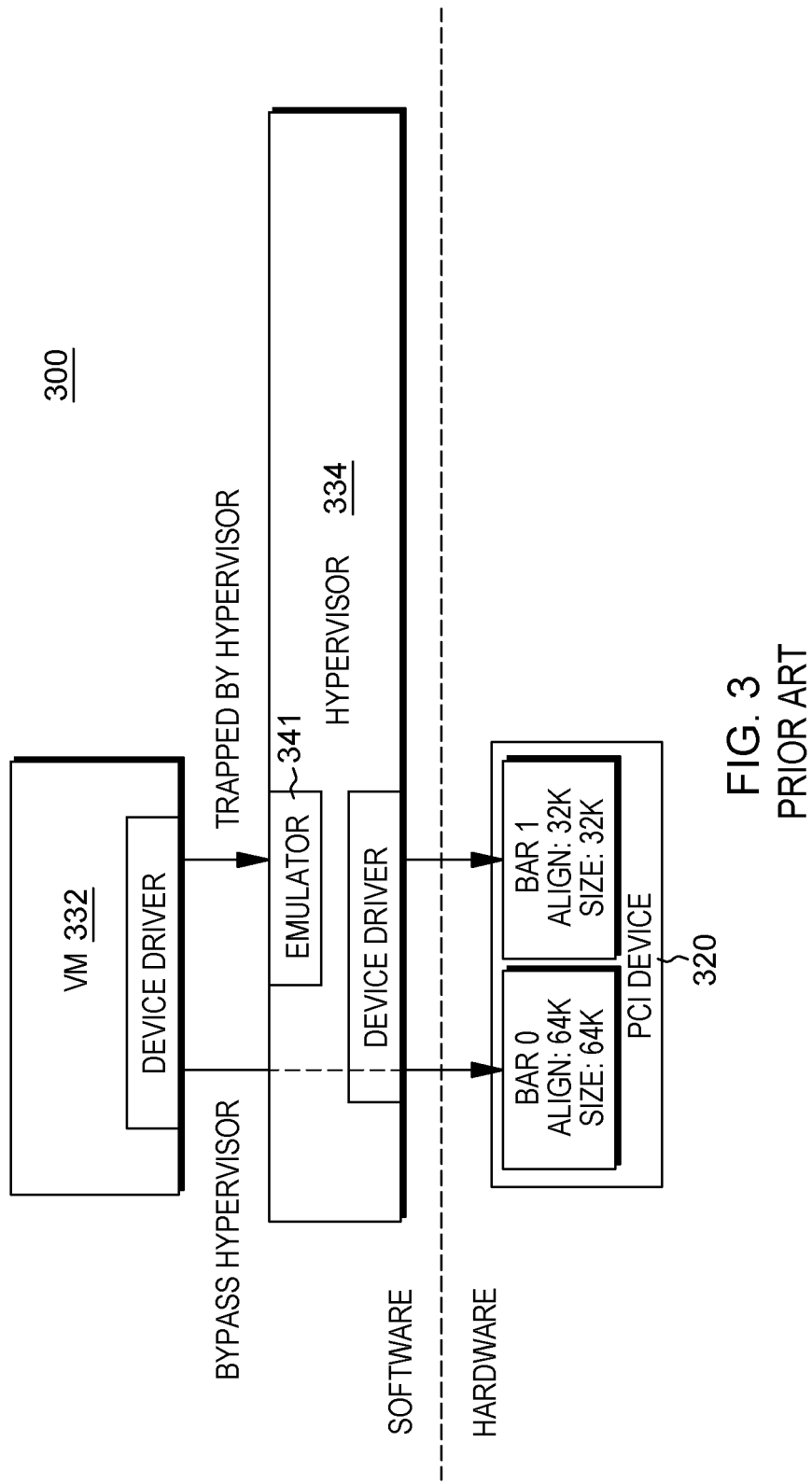
FIG. 3 is an illustration of various aspects of a current method of allocating memory space to a PCI device.

FIG. 3 illustrates an issue experienced in a technical environment 300 with passthroughs when memory pages are shared between more than one PCI device 320. As illustrated in FIG. 3, when a guest wants to access small-size BARs, because the pages of the small-size BARs may contain other devices' BARs, which should not be mapped to a given VM 332 (e.g., because the other device belonging to another VM or the host), one or more programs trap the request into an emulator 341 in the hypervisor 334. Without this trap, this memory allocation would provide a backdoor for VM 332 to PCI devices belonging to other VMs or hosts, which would be a potential security risk.

In contrast to the current method illustrated in FIGS. 1-3, embodiments of the present invention provide a new method to allocate memory address space for those small-size BARs, in virtualized environments. In embodiments of the present invention, one or more programs, executing on at least one processing circuit, consolidate small size BARs into pages for each device, allocating resources. The one or more programs also introduce one or more virtual BARs to guarantee the isolation between different devices. Aspects of various embodiments of the present invention are illustrated in FIGS. 4-11. These figures are provided as non-limiting examples in order to clearly illustrate various aspects of embodiments of the present invention.

Figure 4:
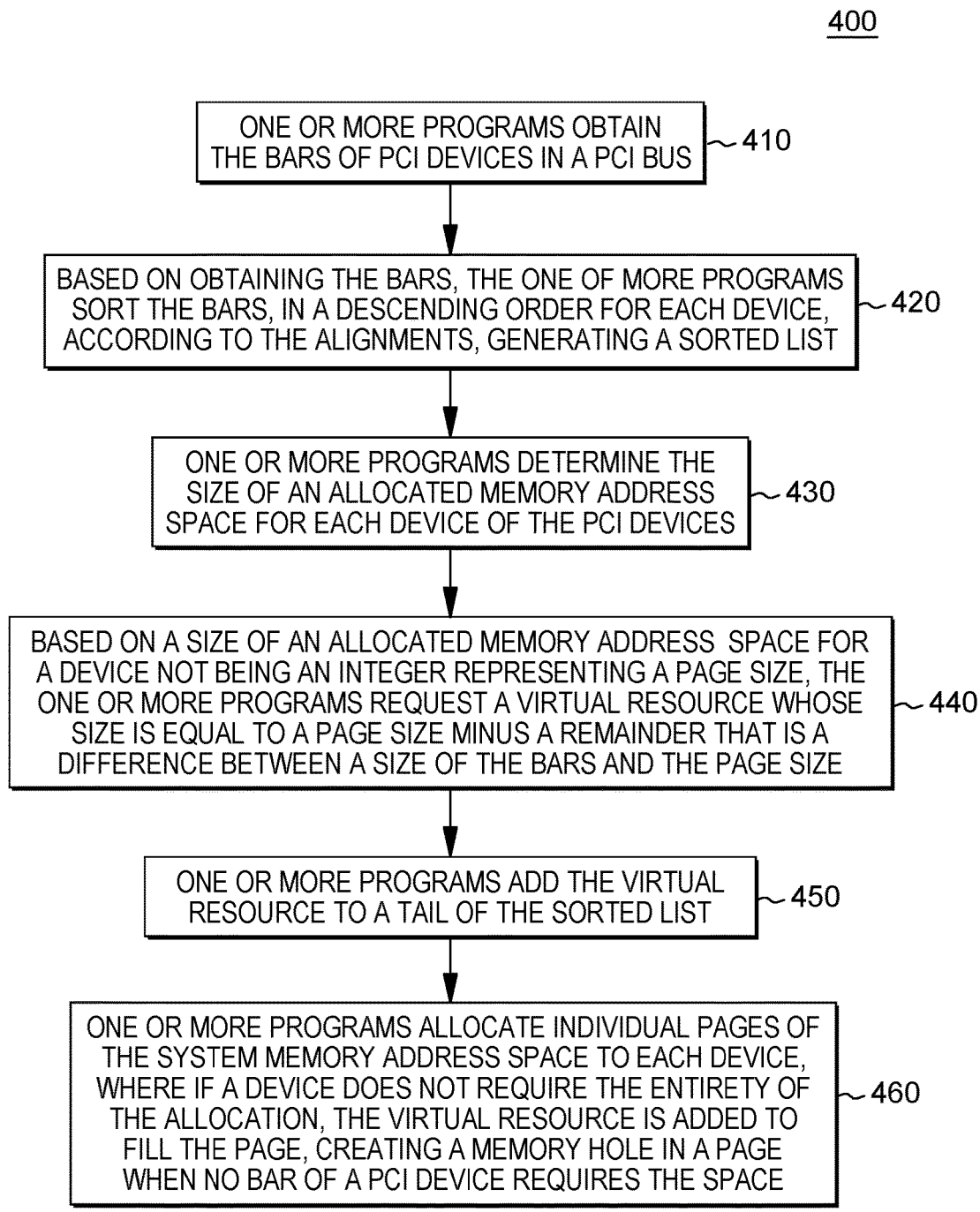
FIG. 4 is a workflow illustrating certain aspects of an embodiment of the present invention.

FIG. 4 is a workflow 400 that includes aspects of some embodiments of the present invention and illustrates how one or more programs allocate memory address space to small-size BARs, in a virtualized environment, such that individual devices do not share pages. In some embodiments of the present invention, one or more programs obtain the BARs of PCI devices in a PCI bus (410). Based on obtaining the BARs, the one of more programs sort the BARs, in a descending order, for each device, according to the alignments, generating a sorted list (420). The one or more programs determine the size of an allocated memory address space for each device of the PCI devices (430). Based on a size of an allocated memory address space for a device not being an integer representing a page size, the one or more programs request a virtual resource whose size is equal to the page size, minus a remainder; the remainder is the difference between a size of the BARs and the page size (440). The one or more programs add the virtual resource to a tail of the sorted list (450). The one or more programs allocate individual pages of the system memory address space to each device, where if a device does not require the entirety of the allocation, the virtual resources is added to fill the page, creating a memory hole in a page when no BAR of a PCI device requires the space (460). This virtual resource prevents the one or more programs from assigning a hot-add device's BAR into a memory hole in the page, because the this portion of the page has already been allocated to another device.

Figure 5:
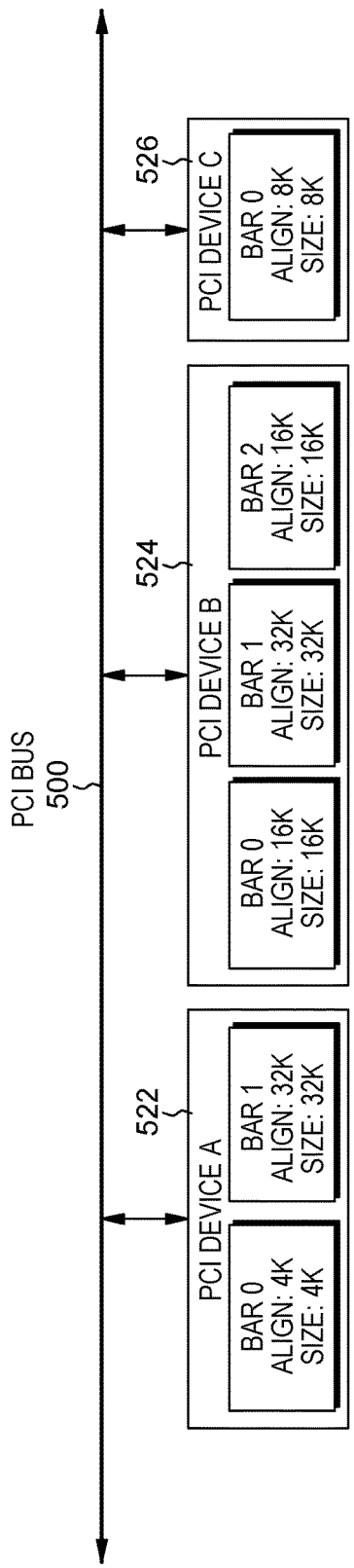
FIG. 5 is an illustration of various aspects of an embodiment of the present invention.

FIG. 5 is an example of a PCI bus 500 with various PCI devices 522 524 526 to which the one or more programs in embodiments of the present invention will allocate system memory, in accordance with the workflow of FIG. 4. Connected to the PCI bus 500 are PCI Device A 522, PCI Device B 524, and PCI Device C 526. PCI Device A 522 includes two BARs, BAR 0, with an alignment of 4K and a size of 4K, and BAR 1 with an alignment of 32K and a size of 32K. PCI Device B 524 includes three BARs, BAR 0, with a size and alignment of 16K, BAR 1 with a size and alignment of 32K, and BAR 2, with a size and alignment of 16K. PCI Device C 526 includes one BAR, BAR 0, with an alignment and a size of 8K. Embodiments of the present invention provide a method for allocating memory address space to small-size BARs in a virtualized environment.

Figure 6:
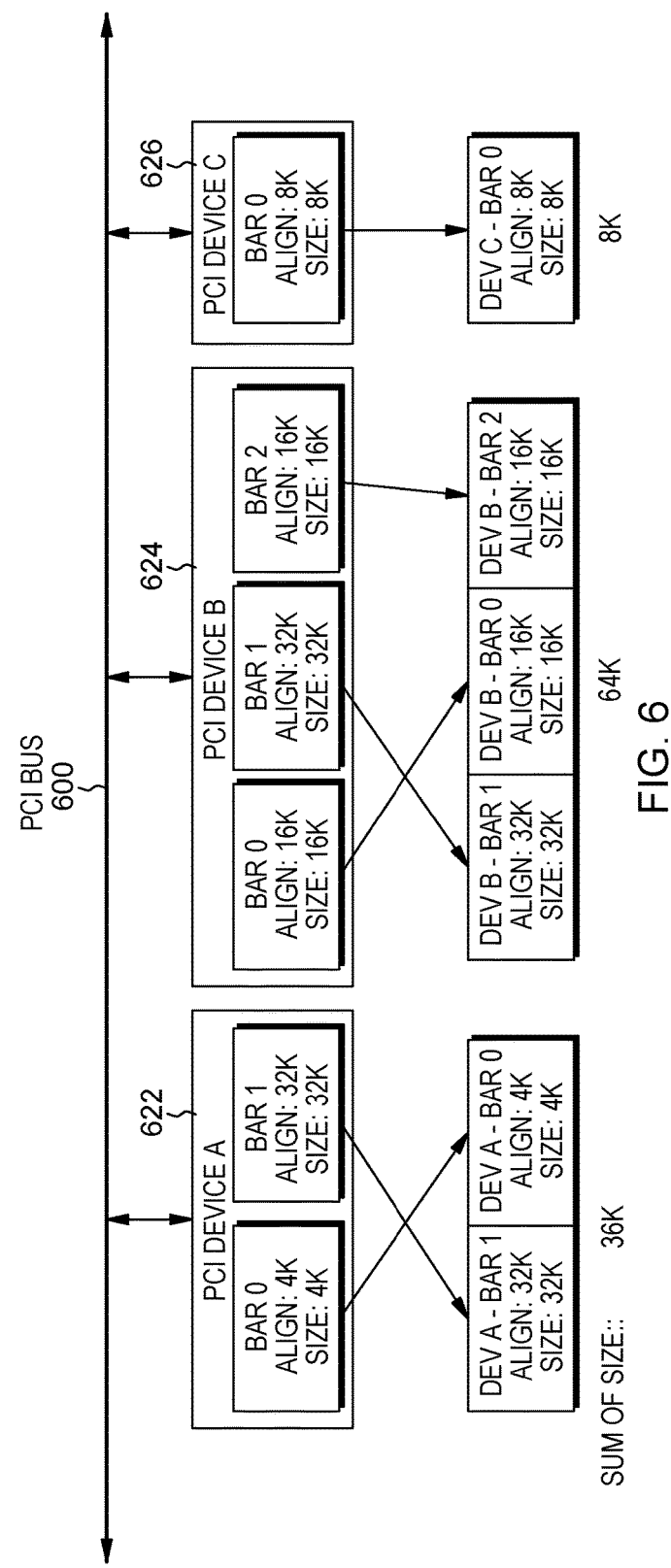
FIG. 6 is an illustration of various aspects of an embodiment of the present invention.

FIG. 6 illustrates the one of more programs sorting the BARs, of PCI devices 622 624 626 into a descending order for each device, according to the alignments, and generating a sorted list, in an embodiment of the present invention (e.g., FIG. 4, 420). As illustrated in FIG. 6, the one or more programs sort the BARs of PCI Device A 622 into a descending order, based on alignment, of BAR 1 (alignment 32K) and then, BAR 0 (alignment 4K). The one or more programs sorts the BARs of PCI Device B 624 into a descending order by alignment of BAR 1 (alignment 32K), BAR 0 (alignment 16K), and BAR 2 (alignment 16K). PCI Device C 626 only has a single bar and therefore, the order is BAR 0 (alignment 8K).

Based on the ordered BARs, the one or more programs determine the size of an allocated memory address space for each device of the PCI devices 622 624 727 (e.g., FIG. 4, 430). As illustrated in FIG. 6, the one or more programs determine that the PCI Device A 622 requires an allocation of a 36K memory address space, PCI Device B 624 requires a 64K memory address space, and PCI Device C 626 requires an 8K memory address space.

Figure 7:
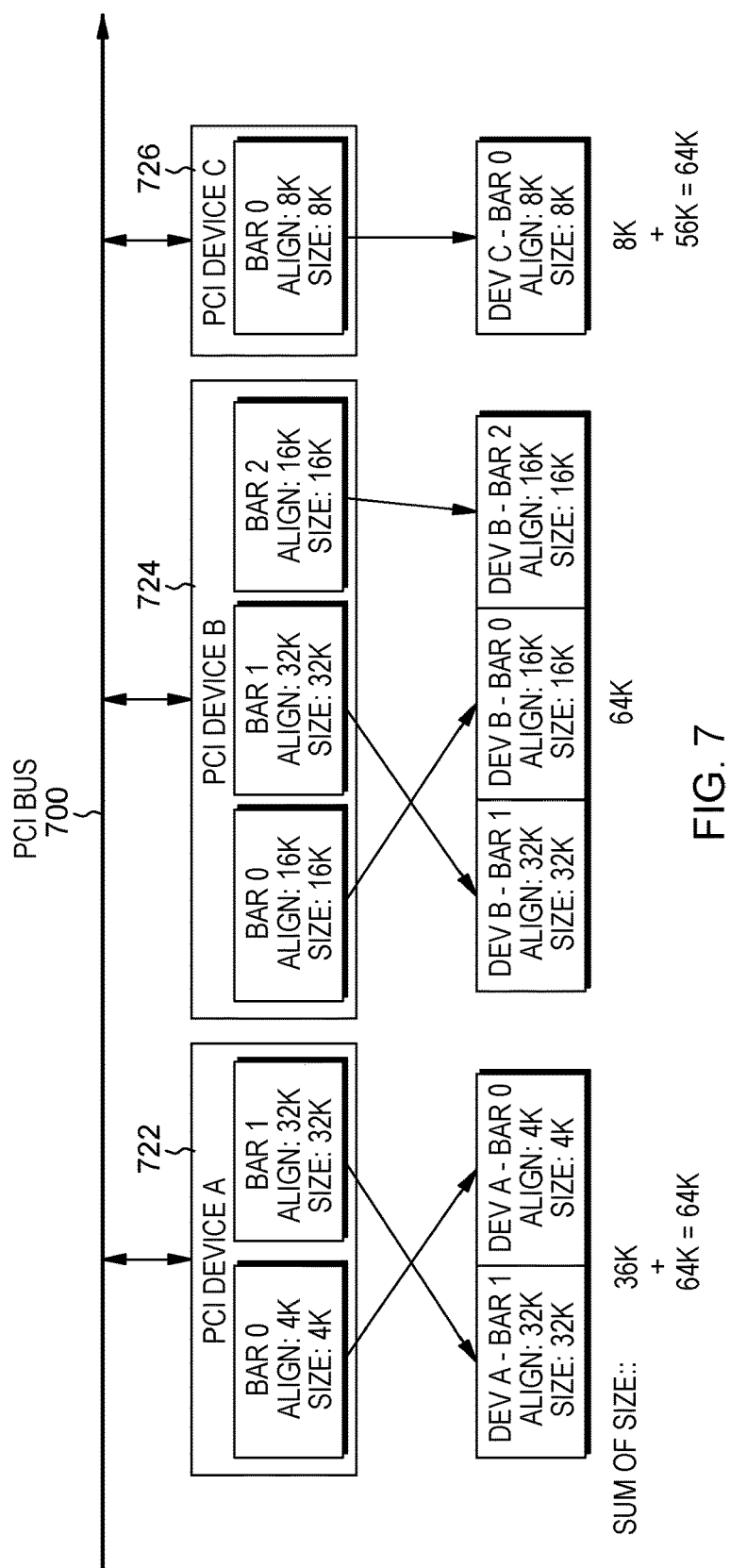
FIG. 7 is an illustration of various aspects of an embodiment of the present invention.

FIG. 7 illustrates the one or more programs determining the difference between the memory address spaces required for each device, and the page size of the pages comprising the system memory address space. In this example, the page size in the address space to be allocated to the PCI devices 722 724 726 is 64K. Thus, while the memory address space to be allocated to PCI Device B 724, is equal to the size of a page (i.e., 64K), the memory to be allocated for PCI Device A 722 and PCI Device C 726 is less than one page. The one or more programs calculate a remainder of 28K related to PCI Device A 722 and a remainder of 56K for PCI Device C 726.

Figure 8:
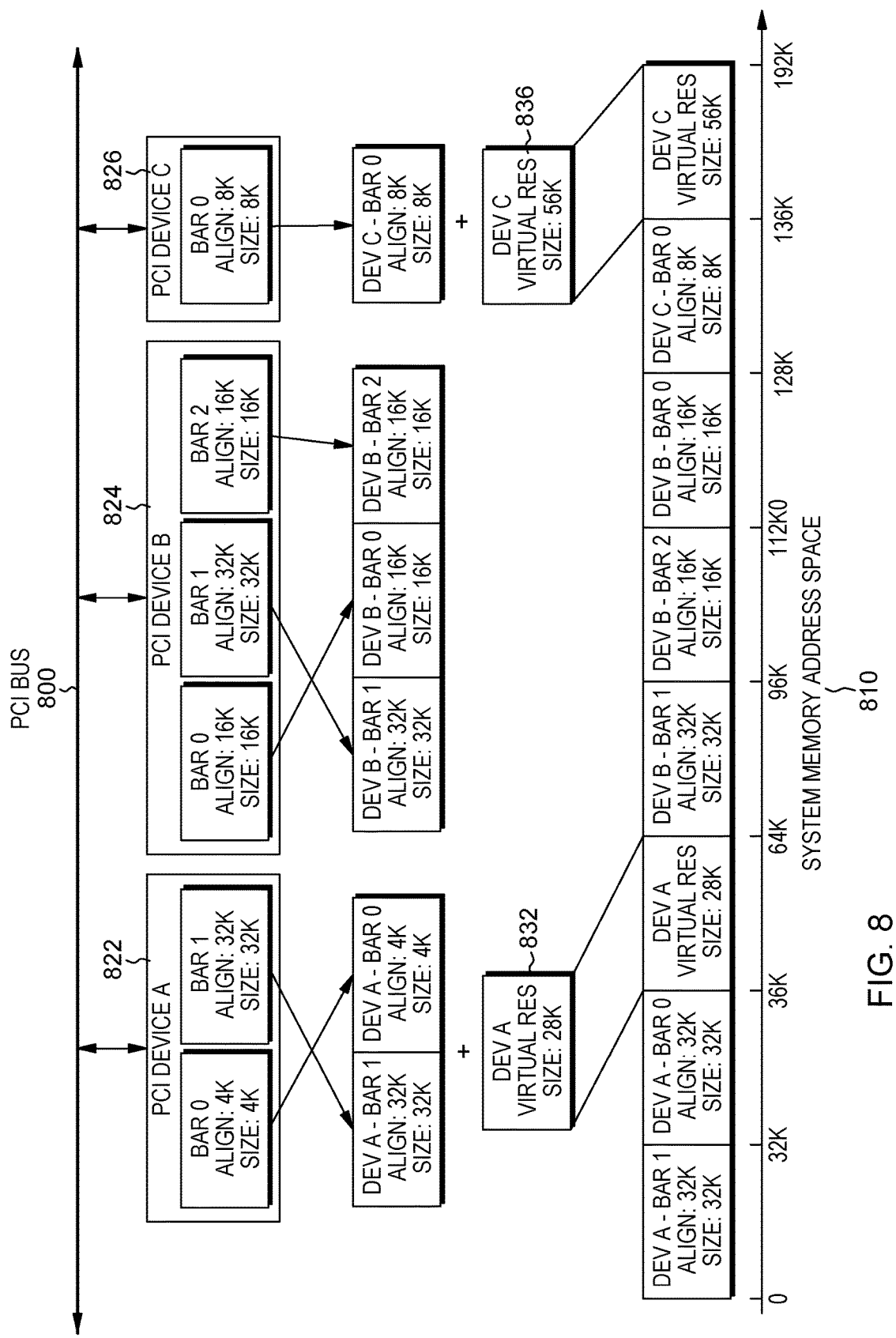
FIG. 8 is an illustration of various aspects of an embodiment of the present invention.

FIG. 8 illustrates how, in embodiments of the present invention, based on a size of an allocated memory address space for a device not being an integer representing a page size, the one or more programs request a virtual resource whose size is equal to a page size minus a remainder that is a different between a size of the BARs and the page size (e.g., FIG. 4, 440) and that the one or more programs add the virtual resource would be added to a tail of the sorted list (e.g., FIG. 4, 440). As illustrated in FIG. 8, the one or more programs calculated a remainder of 28K related to PCI Device A 822 and a remainder of 56K for PCI Device C 826 and requested virtual resource 832 836 the sizes of these remainders. The one or more programs places the Device A Virtual Resource 832 at the tail of the sorted list of BARs, such that the BARs of PCI Device A 822 and the PCI Device A Virtual Resource 832 together comprise 64K of system memory address space 810 (i.e., one page). PCI Device B 824 comprises 64K of system memory address space 810 (i.e., one page) on its own. The one or more programs also place the PCI Device C Virtual Resource 836 at the tail of the BAR for this device (there is no sorted list, per se, because there is only one BAR), such that the BAR of PCI Device C 826 and the PCI Device C Virtual Resource 836 together comprise 64K of system memory address space 810 (i.e., one page).

Figure 9:
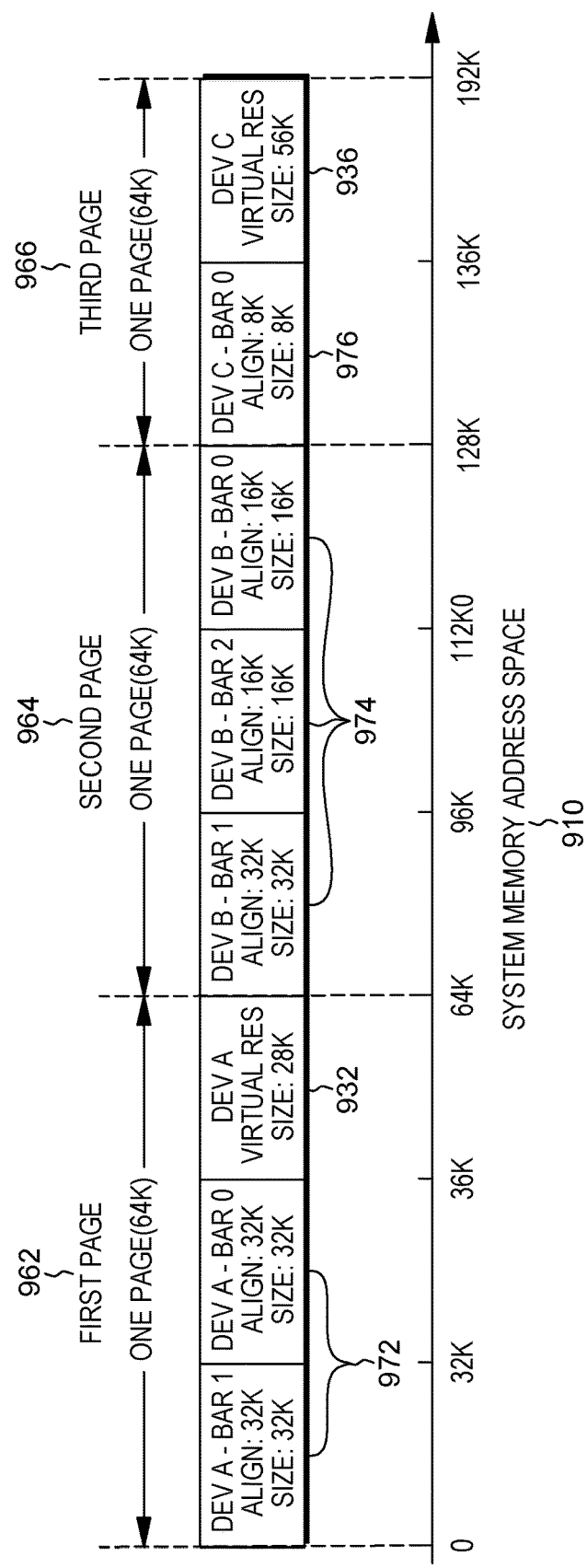
FIG. 9 is an illustration of various aspects of an embodiment of the present invention.

FIG. 9 illustrates how the one or more programs allocate one page to each PCI device in some embodiments of the present invention. The system memory address space 910 in this example is comprised of three pages, each page having a size of 64K: first page 962, second page 964, and third page 966. The one or more programs have allocated one page to each PCI device. Thus, the one or more programs allocated the 64K comprising the first page 962 to the BARs of PCI Device A 972 and the PCI Device A Virtual Resource 932, the one or more programs allocated the 64K comprising the second page 964 to the BARs of PCI Device B 974, and the one or more programs allocated the 64K comprising the third page 966 to the BAR of PCI Device C 976 and the PCI Device C Virtual Resource 936.

Figure 10:
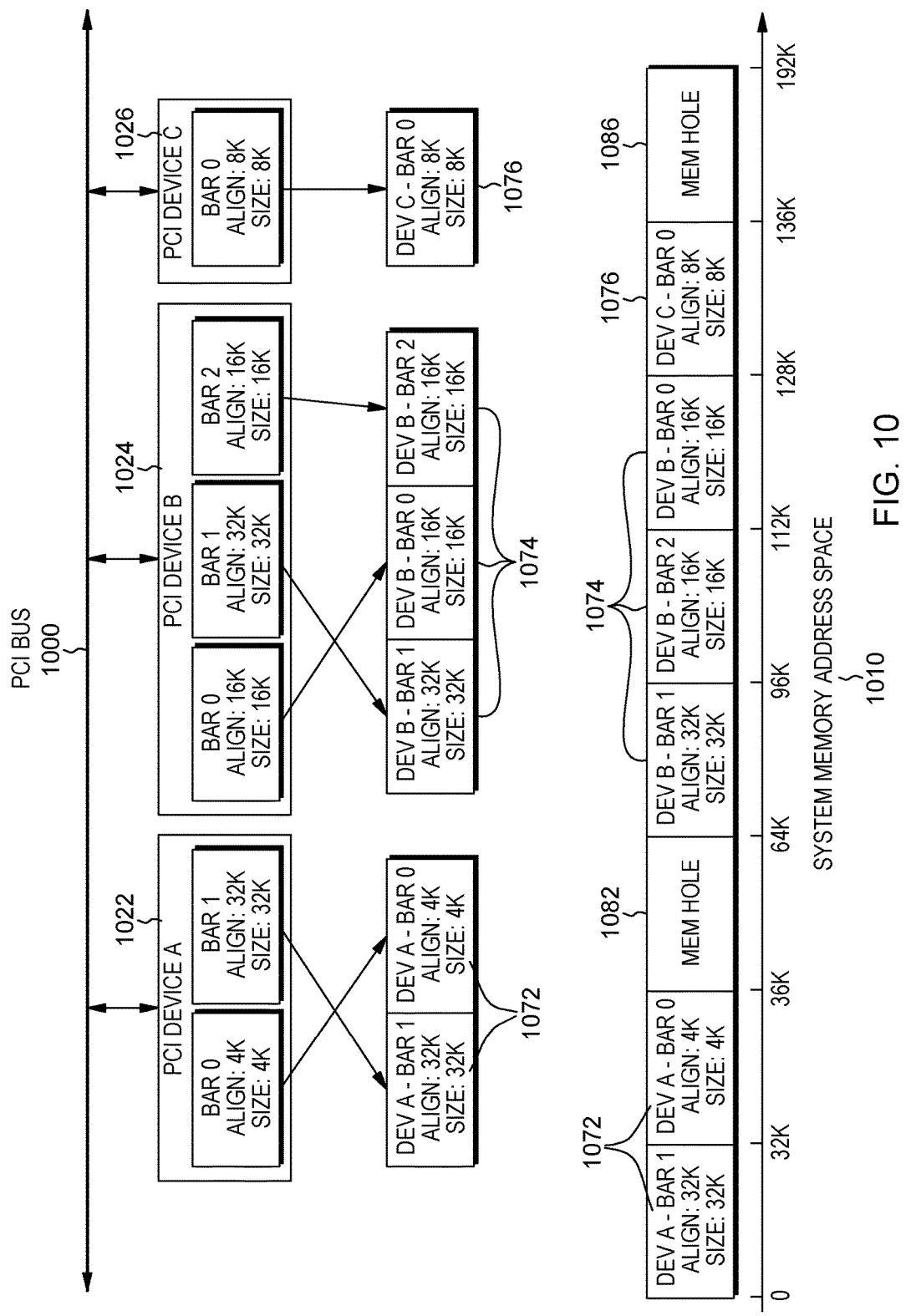
FIG. 10 is an illustration of various aspects of an embodiment of the present invention.

FIG. 10 illustrates the memory holes 1082 1086 that the one or more programs create in pages of the system memory address space 1010, such that each device is allocated the entirety of a given memory page, preventing the sharing of paging among different PCI devices. The memory holes 1082 1086 are formed where the one or more programs allocated portions of pages to virtual resources (e.g., FIG. 9, 932, 936). Thus, the one or more programs allocated different memory pages to BARs of PCI Device A 1022, PCI Device B 1024, and PCI Device C 1026.

As discussed in FIG. 4, the one or more programs allocate individual pages of the system memory address space to each device and when a device does not require the entirety of the allocation available for a given memory page, the one or more programs utilize virtual resources to fill the given page, creating a memory hole (e.g., FIG. 10, 1082 1086) in the given page when no BAR of a PCI device requires the space (460).

Figure 11:
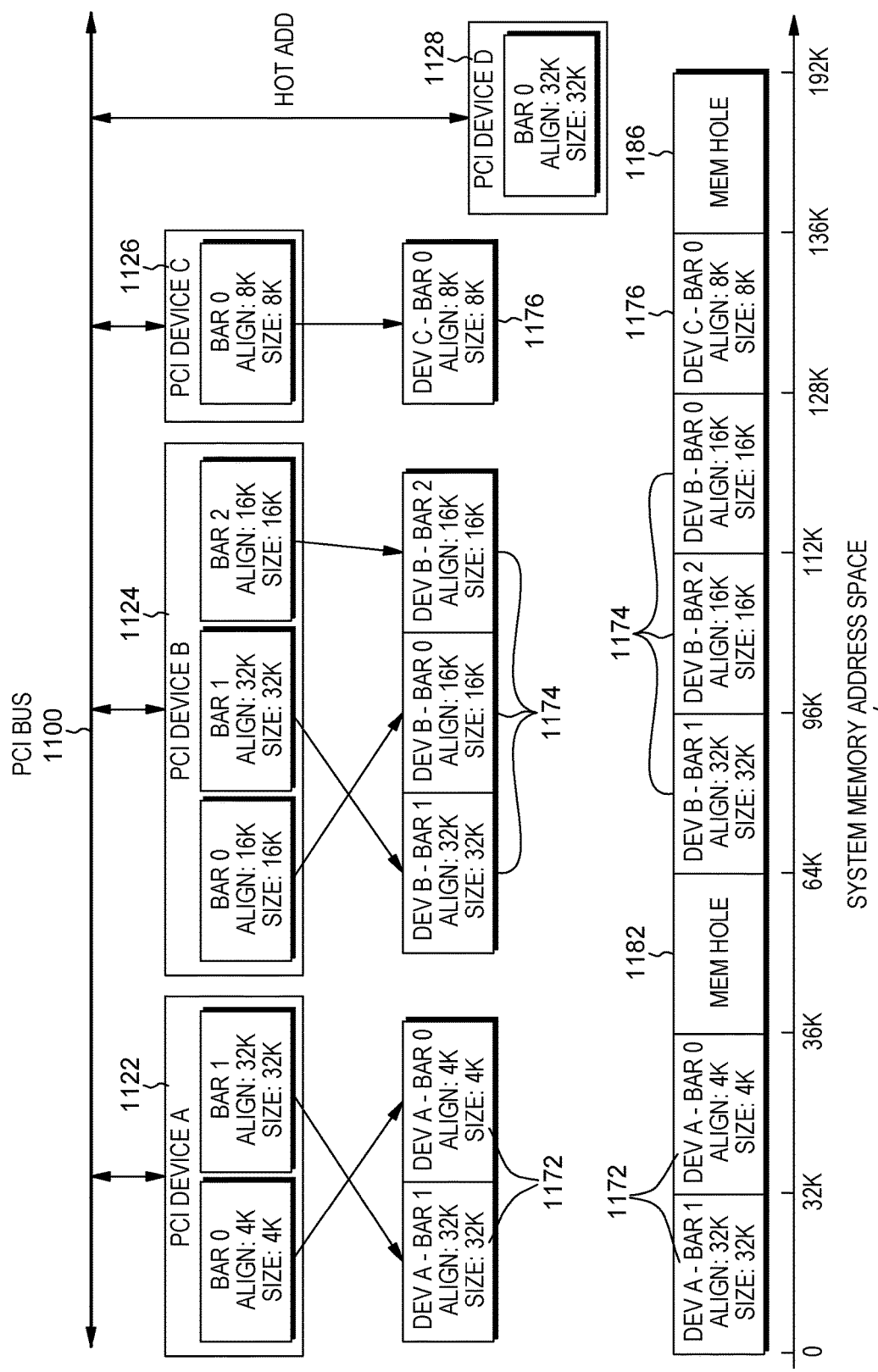
FIG. 11 is an illustration of various aspects of an embodiment of the present invention.

As illustrated in FIG. 11, in embodiments of the present invention, by allocating potentially unused space on a page to a virtual resource, the one or more programs cannot assign this space to a hot-add device's BAR. Specifically, the one or more programs are prevented from allocating space to a hot-add device's BAR, which is a memory hole in the page, which has already been allocated to another device. A hot-add is the addition of an item without restarting a computer system. In FIG. 11, a fourth PCI device, PCI Device D 1128, was hot-added to the PCI bus 1100. The BAR of PCI Device D 1128 is 32K for size and alignment. The BAR 1176 of PCI Device C 1126 is only 32K, leaving 32K remaining in the page assigned to PCI Device C 1126. However, the one or more programs previously allocated the remaining 32K is this page to the PCI Device C Virtual Resource (e.g., FIG. 9, 936), creating a memory hole 1186 in the page. Thus, the one or more programs cannot assign this space, memory hole 1186, to PCI Device D 1128 because the one or more programs previously assigned this space to PCI Device C 1126. Thus, each PCI device in the pictured embodiment of the present invention is isolated from other PCI devices, in memory.

Embodiments of the present invention include a computer-implemented method, a computer program product, and a computer system that allocate system memory address space to devices. Aspects of some embodiments of the present invention include one or more programs executed by one or more processing circuits allocating a page of system memory address space in a computing system to a device. The allocating includes one or more programs obtaining one or more base address registers of the device in a bus communicatively coupled to the one or more processing circuits. The allocation also includes one or more programs determining a portion of the page of the system memory address space to allocate to the one or more base address registers of the device. To determine the portion, one or more programs sort the one or more base address registers, in a descending order, according to alignments of the one or more base address registers. Also to determine the portion, one or more programs add sizes of the sorted one or more base address registers to determine the portion of the page. One or more programs determine a remainder of the page, where the remainder comprises a difference between a size of the page and the portion of the page. Based on the remainder being greater than zero, one or more programs request a virtual resource of a size equal to the remainder. One or more programs allocate the page to the sorted one or more base address registers and to the virtual resource.

In some embodiments of the present invention, the device is a peripheral component interconnect device and the bus is a peripheral component interconnect bus.

In some embodiments of the present invention one or more programs also allocate a second page of the address the system memory address space to a second device, where the allocating of the second page is concurrent to the allocating of the page. The allocating of the second page includes one or more programs obtaining one or more base address registers of the second device in the bus communicatively coupled to the one or more processing circuits. The allocation also includes one or more programs determining a portion of the second page of the system memory address space to allocate to the one or more base address registers of the second device. To determine the portion of the second page, one or more programs sort the one or more base address registers of the second device, in a descending order, according to alignments of the one or more base address registers of the second device. Also to determine the portion of the second page, one or more programs add sizes of the sorted one or more base address registers of the second device to determine the portion of the second page. One or more programs determine a remainder of the second page, where the remainder of the second page comprises a difference between a size of the second page and the portion of the second page. Based on the remainder of the second page being greater than zero, one or more programs request a second virtual resource of a size equal to the remainder of the second page. One or more programs allocate the second page to the sorted one or more base address registers of the second device and to the second virtual resource. In some embodiments of the present invention, the space in the page allocated to the virtual resource includes an isolation buffer between memory address space allocated to the device and memory address spaces allocated to the second device.

In some embodiments of the present invention, the one or more programs hot-add a new device, where the new device includes a base address register equivalent in size to the remainder. The one or more programs allocate, to the new device, a portion of the system memory address space not previously allocated to the device.

In some embodiments of the present invention, the one or more programs, when allocating space, allocate a range of available addresses to the virtual resource after allocating after allocating addresses to the one or more base address registers of the device. The one or more base address registers may include more than one register. In some embodiments of the present invention, the allocated page includes at least two different base address registers.

Referring now to FIG. 12, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the technical environments pictured in FIGS. 5-12, for example, which include a PCI bus and system memory address space can understood as portions of cloud computing node 10 (FIG. 12) and if not a cloud computing node 10, then portions of one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 that can be utilized as cloud computing node 10 is shown in the form of a general-purpose computing device. The components of computer system/server 12 may include, but are not limited to, one or more processing circuits or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
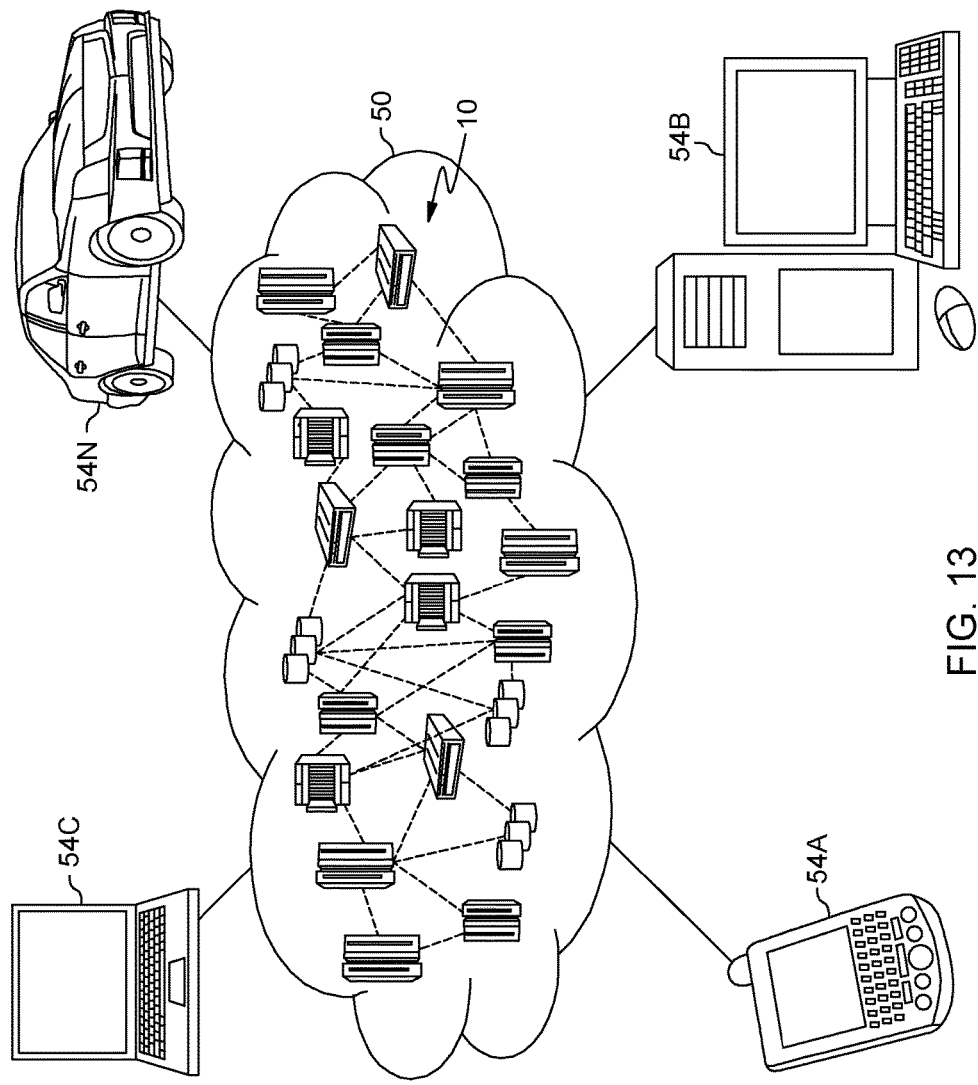
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
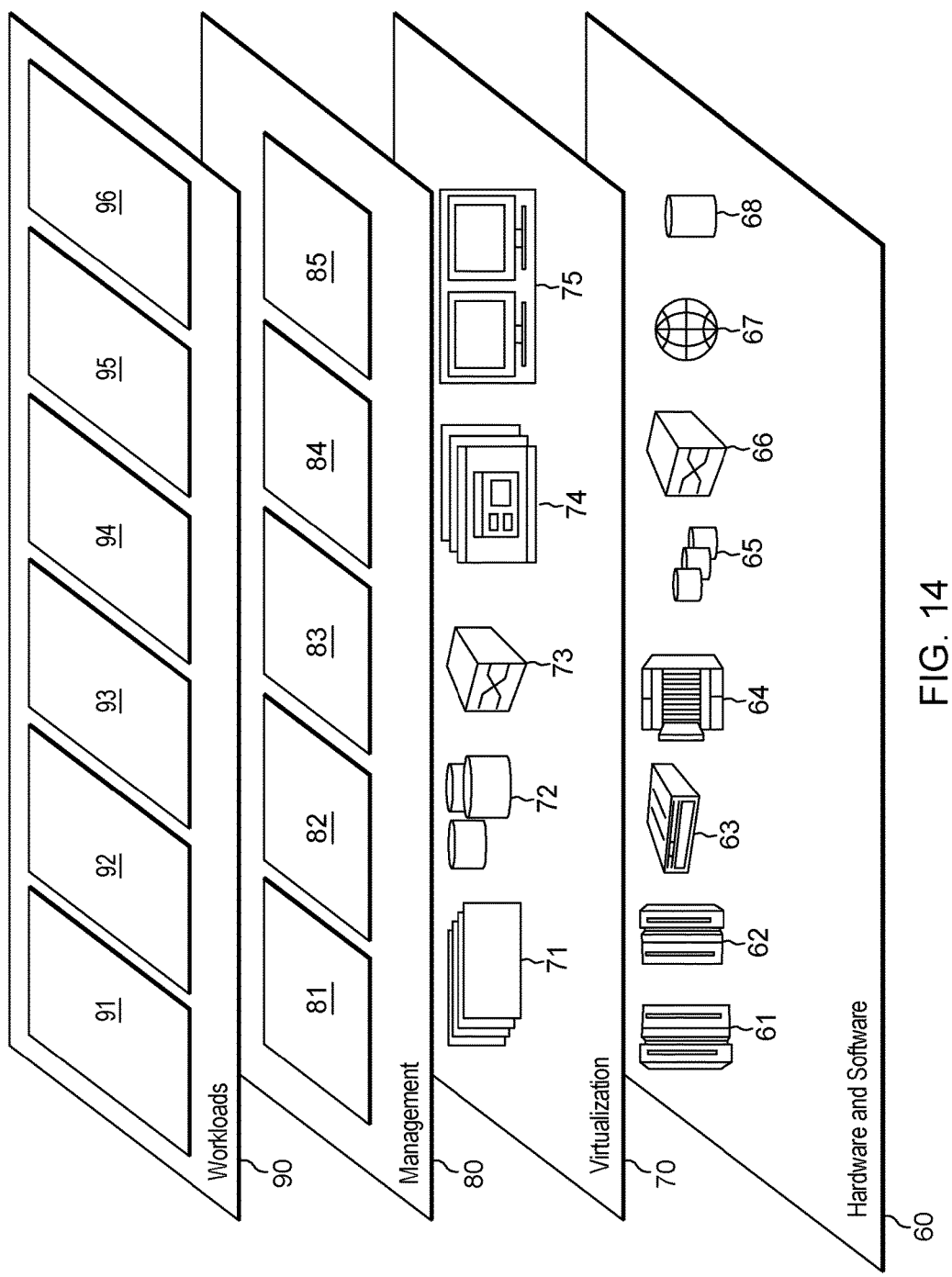
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing allocating memory to PCI devices 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
allocating, by one or more processing circuits, a page of system memory address space in a computing system to a device, the allocating comprising:
  obtaining, by the one or more processing circuits, one or more base address registers of the device in a bus communicatively coupled to the one or more processing circuits;
  determining, by the one or more processing circuits, a portion of the page of the system memory address space to allocate to the one or more base address registers of the device, the determining comprising:
    sorting, by the one or more processing circuits, the one or more base address registers, in a descending order, according to alignments of the one or more base address registers; and
    adding, by the one or more processing circuits, sizes of the sorted one or more base address registers to determine the portion of the page; and
  determining, by the one or more processing circuits, a remainder of the page, wherein the remainder comprises a difference between a size of the page and the portion of the page;
  based on the remainder being greater than zero, requesting, by the one or more processing circuits, a virtual resource of a size equal to the remainder; and
  allocating, by the one or more processing circuits, the page to the sorted one or more base address registers and to the virtual resource.

2. The computer-implemented method of claim 1, wherein the device is a peripheral component interconnect device and the bus is a peripheral component interconnect bus.

3. The computer-implemented method of claim 1, further comprising:
allocating, by the one or more processing circuits, a second page of the address the system memory address space to a second device, wherein the allocating of the second page is concurrent to the allocating of the page, the allocating comprising:
  obtaining, by the one or more processing circuits, one or more base address registers of a second device in the bus communicatively coupled to the one or more processing circuits;
  determining, by the one or more processing circuits, a portion of a second page of the system memory address space to allocate to the one or more base address registers of the second device, the determining comprising:
    sorting, by the one or more processing circuits, the one or more base address registers of the second device, in a descending order, according to alignments of the one or more base address registers of the second device; and
    adding, by the one or more processing circuits, sizes of the sorted one or more base address registers of the second device to determine the portion of the second page; and
  determining, by the one or more processing circuits, a remainder of the second page, wherein the remainder comprises a difference between a size of the second page and the portion of the second page;
  based on the remainder of the second page being greater than zero, requesting, by the one or more processing circuits, a second virtual resource of a size equal to the remainder of the second page; and
  allocating, by the one or more processing circuits, the second page to the sorted one or more base address registers of the second device and the second virtual resource.

4. The computer-implemented method of claim 3, wherein the page was allocated to the sorted one or more base address registers of the device and to the virtual resource and the page comprises a space in the page allocated to the virtual resource, and wherein the space in the page allocated to the virtual resource comprises an isolation buffer between memory address space allocated to the device and memory address spaces allocated to the second device.

5. The computer-implemented method of claim 1, further comprising:
hot-adding, by the one or more processing circuits, a new device, wherein the new device comprises a base address register equivalent in size to the remainder; and
allocating, by the one or more processing circuits, to the new device, a portion of the system memory address space not previously allocated to the device.

6. The computer-implemented method of claim 1, wherein the allocating comprises allocating a range of available addresses to the virtual resource after allocating after allocating addresses to the one or more base address registers of the device.

7. The computer-implemented method of claim 1, wherein the one or more base address registers comprise more than one register.

8. The computer-implemented method of claim 1, wherein the allocated page comprises at least two different base address registers.

9. A computer program product comprising:
a computer readable storage medium readable by one or more processing circuits and storing instructions for execution by the one or more processing circuits for performing a method comprising:
  allocating, by the one or more processing circuits, a page of system memory address space in a computing system to a device, the allocating comprising:
    obtaining, by the one or more processing circuits, one or more base address registers of the device in a bus communicatively coupled to the one or more processing circuits;
    determining, by the one or more processing circuits, a portion of the page of the system memory address space to allocate to the one or more base address registers of the device, the determining comprising:
      sorting, by the one or more processing circuits, the one or more base address registers, in a descending order, according to alignments of the one or more base address registers; and
      adding, by the one or more processing circuits, sizes of the sorted one or more base address registers to determine the portion of the page; and
    determining, by the one or more processing circuits, a remainder of the page, wherein the remainder comprises a difference between a size of the page and the portion of the page;

based on the remainder being greater than zero, requesting, by the one or more processing circuits, a virtual resource of a size equal to the remainder; and allocating, by the one or more processing circuits, the page to the sorted one or more base address registers and to the virtual resource.

10. The computer program product of claim 9, wherein the device is a peripheral component interconnect device and the bus is a peripheral component interconnect bus.

11. The computer program product of claim 9, the method further comprising:

allocating, by the one or more processing circuits, a second page of the address the system memory address space to a second device, wherein the allocating of the second page is concurrent to the allocating of the page, the allocating comprising:

obtaining, by the one or more processing circuits, one or more base address registers of a second device in the bus communicatively coupled to the one or more processing circuits;

determining, by the one or more processing circuits, a portion of a second page of the system memory address space to allocate to the one or more base address registers of the second device, the determining comprising:

sorting, by the one or more processing circuits, the one or more base address registers of the second device, in a descending order, according to alignments of the one or more base address registers of the second device; and adding, by the one or more processing circuits, sizes of the sorted one or more base address registers of the second device to determine the portion of the second page; and determining, by the one or more processing circuits, a remainder of the second page, wherein the remainder comprises a difference between a size of the second page and the portion of the second page;

based on the remainder of the second page being greater than zero, requesting, by the one or more processing circuits, a second virtual resource of a size equal to the remainder of the second page; and allocating, by the one or more processing circuits, the second page to the sorted one or more base address registers of the second device and the second virtual resource.

12. The computer program product of claim 11, wherein the page was allocated to the sorted one or more base address registers of the device and to the virtual resource and the page comprises a space in the page allocated to the virtual resource, and wherein the space in the page allocated to the virtual resource comprises an isolation buffer between memory address space allocated to the device and memory address spaces allocated to the second device.

13. The computer program product of claim 9, the method further comprising:

hot-adding, by the one or more processing circuits, a new device, wherein the new device comprises a base address register equivalent in size to the remainder; and allocating, by the one or more processing circuits, to the new device, a portion of the system memory address space not previously allocated to the device.

14. The computer program product of claim 9, wherein the allocating comprises allocating a range of available addresses to the virtual resource after allocating after allocating addresses to the one or more base address registers of the device.

15. The computer program product of claim 9, wherein the one or more base address registers comprise more than one register.

16. The computer program product of claim 9, wherein the allocated page comprises at least two different base address registers.

17. A system comprising:
a memory;
one or more processing circuits in communication with the memory; and
program instructions executable by the one or more processing circuits via the memory to perform a method, the method comprising:

allocating, by the one or more processing circuits, a page of system memory address space in a computing system to a device, the allocating comprising:

obtaining, by the one or more processing circuits, one or more base address registers of the device in a bus communicatively coupled to the one or more processing circuits;

determining, by the one or more processing circuits, a portion of the page of the system memory address space to allocate to the one or more base address registers of the device, the determining comprising:

sorting, by the one or more processing circuits, the one or more base address registers, in a descending order, according to alignments of the one or more base address registers; and adding, by the one or more processing circuits, sizes of the sorted one or more base address registers to determine the portion of the page; and determining, by the one or more processing circuits, a remainder of the page, wherein the remainder comprises a difference between a size of the page and the portion of the page;

based on the remainder being greater than zero, requesting, by the one or more processing circuits, a virtual resource of a size equal to the remainder; and allocating, by the one or more processing circuits, the page to the sorted one or more base address registers and to the virtual resource.

18. The computer system of claim 17, wherein the device is a peripheral component interconnect device and the bus is a peripheral component interconnect bus.

19. The computer system of claim 17, the method further comprising:

allocating, by the one or more processing circuits, a second page of the address the system memory address space to a second device, wherein the allocating of the second page is concurrent to the allocating of the page, the allocating comprising:

obtaining, by the one or more processing circuits, one or more base address registers of a second device in the bus communicatively coupled to the one or more processing circuits;

determining, by the one or more processing circuits, a portion of a second page of the system memory address space to allocate to the one or more base address registers of the second device, the determining comprising:

sorting, by the one or more processing circuits, the one or more base address registers of the second device, in a descending order, according to alignments of the one or more base address registers of the second device; and adding, by the one or more processing circuits, sizes of the sorted one or more base address registers of the second device to determine the portion of the second page; and determining, by the one or more processing circuits, a remainder of the second page, wherein the remainder comprises a difference between a size of the second page and the portion of the second page;

based on the remainder of the second page being greater than zero, requesting, by the one or more processing circuits, a second virtual resource of a size equal to the remainder of the second page; and allocating, by the one or more processing circuits, the second page to the sorted one or more base address registers of the second device and the second virtual resource.

20. The computer system of claim 19, wherein the page was allocated to the sorted one or more base address registers of the device and to the virtual resource and the page comprises a space in the page allocated to the virtual resource, and wherein the space in the page allocated to the virtual resource comprises an isolation buffer between memory address space allocated to the device and memory address spaces allocated to the second device.

* * * * *